Patented Feb. 1, 1938

2,106,877

UNITED STATES PATENT OFFICE 2,106,877

PROCESS OF PRODUCING ALCOHOLS FROM ALKYL SULPHURIC ACIDS

William H. Shiffler and Melvin M. Holm, Berkeley, and Marvin F. Miller, Albany, Calif., assignors to Standard Oil Company of California, San Francisco, Calif., a corporation of Delaware No Drawing. Application August 22, 1930, Serial No. 477,146

9 Claims. (Cl. 260—156)

This invention relates to a process of producing secondary and tertiary alcohols from the sulphuric acid absorption products of olefins containing from three to five carbon atoms, inclusive.

Olefins containing from three to five carbon atoms, inclusive i. e., propylene, the normal butenes, isobutene and amylenes are ordinarily converted into alcohols by reaction with or absorption by sulphuric acid with the formation of the alkyl sulphuric acids. These sulphuric acid absorption products are then diluted with water or neutralized to effect hydrolysis of the alkyl sulphuric acids to the acohols and the alcohols are removed by distillation. The strengths of the acids used for absorption and the temperatures under which the absorption is carried out vary and are determined by the reactivity of the several olefins with sulphuric acid.

The principal commercial difficulties in the conversion of these olefins to corresponding alcohols lie first, in the ease with which they polymerize to heavier oils in the absorption step, and second, in the ease with which the acid absorption products are in part polymerized and in part decomposed to re-form the original olefins during the distillation step. In an endeavor to avoid these losses due to polymerization and decomposition, the commercial art has been led to develop other methods than the sulphuric acid absorption method for the production of certain of the alcohols, particularly the butyl and amyl alcohols, notably through the formation of the chlorides.

In the distillation step from the sulphuric acid absorption products the tendency is more definitely towards decomposition into the original olefins in the case of the secondary alcohols and towards polymerization in the case of tertiary alcohols. This difficulty is so real and the loss is so great that tertiary butyl alcohol and tertiary amyl alcohol are not oridinarily distilled from the diluted acid absorption product without first neutralizing the acid liquid with alkali prior to distillation.

In other cases, as in that of the secondary butyl alcohol, the acid reaction products are diluted to such an extent in an attempt to avoid the aforesaid losses, that the economy of reconcentrating the acid for re-use as an absorbent becomes questionable and is in any event costly.

We have discovered that if the distillation of alcohols is carried out under reduced pressure the losses due to polymerization are practically completely eliminated and the losses due to decomposition are reduced to but a very small fraction of those obtained under distillation at atmospheric pressures. Thus, the quantity of the alcohols approaches the theoretical yields possible on the basis of the quantities of the individual olefins originally reacted upon by the sulphuric acid. The most remarkable results appear in the instance of the conversion of isobutene to tertiary butyl alcohol; it has now become possible to distill the alcohol directly from a relatively strong acid solution without its neutralization. By this means both the cost of the alkali necessary for neutralization of the acid and the original cost of the sulphuric acid is saved, since the latter may now be used for further olefin absorption. This is also true in the case of the production of tertiary amyl alcohol.

In the instance where secondary butyl alcohol is to be obtained by distillation under reduced pressure from relatively strong acid solutions our process avoids to a large degree, the expensive reconcentration of the acid for its re-use in the absorbing process.

The present invention will best be understood from the description of a number of examples of the invention as it is applied to the distillation of different alcohols from the corresponding sulphuric acid absorption products.

*Example 1.*—The normal butenes were absorbed in sulphuric acid in the usual manner, after which the absorption product was diluted to an acidity of 52.3 percent $H_2SO_4$ on the alcohol-free basis; the diluted solution contained an equivalent of 17.3 volume percent of secondary butyl alcohol. Distillation was then carried out, in one case at atmospheric pressure; in a second case at reduced pressure (0.1 atmosphere). The yields of alcohol, together with the amounts of alcohol decomposed to the original olefins and polymerized to oils are shown in the table:

|   |   | Ordinary distillation | Distillation at reduced pressure |
|---|---|---|---|
|   |   | Percent | Percent |
| 1 | Alcohol obtained, percent of theoretical | 38.7 | 90.9 |
| 2 | Alcohol decomposed to olefin gas | 36.9 | 9.1 |
| 3 | Alcohol polymerized to oil | 24.4 | None |

*Example 2.*—Isobutene was absorbed in sulphuric acid in the usual manner and the absorption product diluted to an acidity of 44.7 percent $H_2SO_4$ on an alcohol-free basis; this diluted solution contained an equivalent of 20.6 volume percent of tertiary butyl alcohol. The solution was distilled as before, in one case at atmospheric pressure; in the second case at reduced pressure (0.1 atmosphere). The yields of alcohol, together with the amounts decomposed and polymerized, are set forth as in the first example:

|   |   | Distillation at atmospheric pressure | Distillation at reduced pressure |
|---|---|---|---|
| 1 | Alcohol obtained, percent of theoretical | Percent 52.8 | Percent 96.1 |
| 2 | Alcohol decomposed to olefin gas | 19.0 | 3.9 |
| 3 | Alcohol polymerized to oils | 28.2 | None |

In the case of isopropyl alcohol distillation from an acid absorption liquor diluted to 60 percent $H_2SO_4$ (on an alcohol-free basis), a 95 percent yield was obtained at 0.1 atmosphere; no polymerization to oils resulted.

*Example 3.*—Alkyl sulphuric acid containing the equivalent of 20% by volume of secondary amyl alcohol (di-ethyl carbinol) and 80% by volume of 60% by weight sulphuric acid was distilled in one instance at atmospheric pressure and in the second case under a reduced pressure of 0.1 atmosphere. The yields of alcohol together with the amounts of decomposition and polymerization are set forth as in the first example.

|   |   | Distillation at atmospheric pressure | Distillation at reduced pressure |
|---|---|---|---|
| 1 | Alcohol obtained, percent theoretical | Percent 10 | Percent 78 |
| 2 | Alcohol decomposed to olefin gas | 82 | 18 |
| 3 | Alcohol polymerized to oils | 8 | 4 |

*Example 4.*—In distilling tertiary amyl alcohol from the corresponding alkyl sulphuric acid the following results were obtained from an acid solution containing the equivalent of 20% by volume of tertiary amyl alcohol and 80% by volume of 40% by weight sulphuric acid. In the first case the solutions are distilled at atmospheric pressure; in the second case at a reduced pressure of 0.1 atmosphere.

|   |   | Distillation at atmospheric pressure | Distillation at reduced pressure |
|---|---|---|---|
| 1 | Alcohol obtained, percent theoretical | Percent 44 | Percent 96 |
| 2 | Alcohol decomposed to olefin gas | 39 | 2 |
| 3 | Alcohol ploymerized to oils | 17 | 2 |

In addition to the practically elimination of polymerization and decomposition losses realized by distillation at reduced pressures, an advantage of great importance is brought about by the possibility of re-concentrating the acid to the desired strength for re-use. If such re-concentration is necessary or desirable, it can be carried out by continuing the distillation in an alcohol still under reduced pressure after the alcohol has been removed. Moreover, by refluxing the distillate from the still in a reflux column the several alcohols may be removed as practically pure constant boiling alcohol-water mixtures. Since the oxidation and polymerization of the alkyl sulphuric acids is avoided the concentration of the sulphuric acid may take place under the reduced pressure without material decomposition of the sulphuric acid and without production of sulphur dioxide or oxidation of acid soluble carbonaceous material.

By the process of the present invention the expensive concentrating equipment necessary as the process is usually carried out is eliminated. A very material loss of sulphuric acid by reduction to $SO_2$ suffered from atmospheric pressure distillation is eliminated.

While the particular forms of the invention herein described are well adapted to carry out the process of the invention, it is to be understood that various modifications and changes may be made without departing from the spirit of the invention, and the invention is of the scope set forth in the appended claims.

We claim:

1. A process of manufacturing tertiary amyl alcohol which comprises distilling a mixture of sulphuric acid and alkyl sulphuric acids derived from the absorption of amylene, and corresponding to tertiary amyl alcohol, the admixture containing an appreciable amount of free sulphuric acid and being substantially devoid of free alcohol, the distillation being carried out under a pressure lower than atmospheric to hydrolyze and vaporize alcohol therefrom.

2. A process of manufacturing secondary and tertiary alcohols which comprises distilling an admixture derived from the absorption of olefines containing from three to five carbon atoms, inclusive, and corresponding to secondary and tertiary alcohols, by sulphuric acid, which mixture contains about 45% free sulphuric acid and substantially devoid of free alcohol, the distillation being conducted under pressures lower than atmospheric to hydrolyze and vaporize alcohol therefrom until the acid is reconcentrated.

3. A process of producing tertiary amyl alcohol which comprises subjecting to distillation a mixture derived from the reaction of amylene and corresponding to tertiary amyl alcohol, with sulphuric acid, which mixture contains an appreciable quantity of free sulphuric acid, and is substantially devoid of free alcohol, the distillation being carried out under a pressure lower than atmospheric so as to vaporize tertiary alcohol and water therefrom.

4. A process of preparing secondary and tertiary alcohols of not more than five carbon atoms from an aqueous solution containing one or more of the corresponding alkyl sulphates, together with a substantial amount of uncombined sulphuric acid which consists in subjecting such solution to distillation at pressures substantially below atmospheric.

5. A process of preparing secondary and tertiary alcohols of not more than five carbon atoms from an aqueous solution containing one or more of the corresponding alkyl sulphates, together with a substantial amount of uncombined sulphuric acid which consists in subjecting such solution to distillation at pressures substantially below atmospheric, the solution containing at least 40% of free sulphuric acid.

6. A process of preparing secondary and tertiary alcohols of not more than five carbon atoms from an aqueous solution containing one or more of the corresponding alkyl sulphates, together with a substantial amount of uncombined sulphuric acid which consists in subjecting such solution to distillation at pressures substantially below atmospheric and a solution containing at least 50% free sulphuric acid.

7. A process of preparing secondary and tertiary alcohols of not more than five carbon atoms from an aqueous solution containing one or more of the corresponding alkyl sulphates, together with a substantial amount of uncombined sulphuric acid which consists in subjecting such solution to distillation at pressures of about 0.1 atmosphere.

8. A process of obtaining secondary and tertiary alcohols which comprises distilling an admixture derived from the absorption of olefines containing four carbon atoms, and corresponding to said alcohols, which mixture contains about one part of acid to one part of water, the distillation being effected under pressures lower than atmospheric to hydrolyze and vaporize alcohol therefrom.

9. The process of producing tertiary amyl (pentyl) alcohol from an acid aqueous solution containing the reaction products of olefines of five carbon atoms, and corresponding at least in part to tertiary amyl alcohol, with aqueous sulphuric acid which comprises subjecting such solution, containing an appreciable quantity of free sulphuric acid, to distillation at a pressure lower than atmospheric to hydrolyze and vaporize alcohol therefrom.

WILLIAM H. SHIFFLER.
MELVIN M. HOLM.
MARVIN F. MILLER.